United States Patent
Ribarov et al.

(10) Patent No.: US 10,302,015 B2
(45) Date of Patent: May 28, 2019

(54) ADAPTIVE TURBOMACHINE COOLING SYSTEM

(71) Applicant: United Technologies Corporation, Farmington, CT (US)

(72) Inventors: Lubomir A. Ribarov, West Hartford, CT (US); Leo J. Veilleux, Jr., Wethersfield, CT (US); James S. Elder, Jr., South Windsor, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 375 days.

(21) Appl. No.: 15/105,385

(22) PCT Filed: Nov. 19, 2014

(86) PCT No.: PCT/US2014/066357
§ 371 (c)(1),
(2) Date: Jun. 16, 2016

(87) PCT Pub. No.: WO2015/122949
PCT Pub. Date: Aug. 20, 2015

(65) Prior Publication Data
US 2016/0312703 A1 Oct. 27, 2016

Related U.S. Application Data

(60) Provisional application No. 61/916,890, filed on Dec. 17, 2013.

(51) Int. Cl.
*F02C 6/08* (2006.01)
*F02C 7/18* (2006.01)
(Continued)

(52) U.S. Cl.
CPC ............... *F02C 7/18* (2013.01); *F01D 11/24* (2013.01); *F01D 15/005* (2013.01); *F01D 25/12* (2013.01);
(Continued)

(58) Field of Classification Search
CPC ........ F01D 11/24; F01D 15/005; F01D 25/12; F02C 7/14; F02C 7/18; F02C 7/222;
(Continued)

(56) References Cited

U.S. PATENT DOCUMENTS 4,041,697 A 8/1977 Coffinberry et al.
5,611,197 A * 3/1997 Bunker .................. F02C 7/185
 415/115

(Continued)

OTHER PUBLICATIONS

Notification of Transmittal of the International Search Report of the International Searching Authority, or the Declaration; PCT/US2014/066357; dated Aug. 26, 2015. 3 pages.
(Continued)

*Primary Examiner* — Jesse S Bogue
(74) *Attorney, Agent, or Firm* — Cantor Colburn LLP

(57) ABSTRACT

In accordance with at least one aspect of this disclosure, a turbomachine cooling system includes a first low pressure port disposed in a low pressure portion of a turbomachine and a first high pressure port disposed in a high pressure portion of the turbomachine and in selective fluid communication with the first low pressure port via a cooling channel. The high pressure portion of the turbomachine is configured for a higher compression than the low pressure portion of the turbomachine where the first low pressure port is disposed. The cooling system can include a heat exchanger system disposed in the cooling channel such that a flow traveling from the first high pressure port to the first low pressure port is cooled by the heat exchanger system (Continued)

before traveling through the first low pressure port into the low pressure portion of the turbomachine.

18 Claims, 2 Drawing Sheets

(51) Int. Cl.
| | |
|---|---|
| F01D 25/12 | (2006.01) |
| F01D 11/24 | (2006.01) |
| F01D 15/00 | (2006.01) |
| F02C 7/14 | (2006.01) |
| F02C 7/22 | (2006.01) |
| F02C 9/18 | (2006.01) |
| F04D 29/32 | (2006.01) |

(52) U.S. Cl.
CPC ............... *F02C 7/14* (2013.01); *F02C 7/222* (2013.01); *F02C 9/18* (2013.01); *F04D 29/321* (2013.01); *F05D 2220/32* (2013.01); *F05D 2240/307* (2013.01); *F05D 2260/213* (2013.01); *Y02T 50/671* (2013.01); *Y02T 50/676* (2013.01)

(58) Field of Classification Search
CPC ...... F02C 9/18; F04D 29/321; F05D 2220/32; F05D 2240/307; F05D 2260/213; Y02T 50/671; Y02T 50/676
See application file for complete search history.

(56) References Cited

U.S. PATENT DOCUMENTS

| | | | | |
|---|---|---|---|---|
| 5,732,547 A * | 3/1998 | Olsen | ................... | G10K 11/178 |
| | | | | 60/204 |
| 6,532,744 B1 * | 3/2003 | Reiter | ................... | F02C 7/18 |
| | | | | 415/115 |
| 7,263,834 B2 * | 9/2007 | Reiter | ................... | F01D 5/187 |
| | | | | 415/115 |
| 8,683,811 B2 * | 4/2014 | Clemen | ................... | F02C 6/08 |
| | | | | 60/204 |
| 9,458,855 B2 * | 10/2016 | Dierksmeier | ........... | F01D 11/24 |
| 2008/0304958 A1 | 12/2008 | Norris et al. | | |
| 2009/0193812 A1 | 8/2009 | Kirzhner | | |
| 2010/0024383 A1 | 2/2010 | Chandrabose et al. | | |
| 2010/0313573 A1 * | 12/2010 | Walters | ................... | F02C 9/18 |
| | | | | 60/785 |
| 2010/0319359 A1 * | 12/2010 | Holt | ................... | F02C 6/08 |
| | | | | 60/782 |
| 2011/0173983 A1 | 7/2011 | Pinson et al. | | |
| 2013/0036747 A1 * | 2/2013 | Fuchs | ................... | F01D 5/187 |
| | | | | 60/782 |
| 2013/0187007 A1 * | 7/2013 | Mackin | ................... | F02C 9/18 |
| | | | | 244/134 R |
| 2015/0040574 A1 * | 2/2015 | Wichmann | ................... | F02C 3/34 |
| | | | | 60/773 |

OTHER PUBLICATIONS

Notification of Transmittal of the Written Opinion of the International Searching Authority, or the Declaration; PCT/US2014/066357; dated Aug. 26, 2015. 7 pages.

\* cited by examiner

ADAPTIVE TURBOMACHINE COOLING SYSTEM

RELATED APPLICATIONS

This application is a National Phase Application of Patent Application PCT/US2014/066357 filed on Nov. 19, 2014, which claims the benefit of and priority to U.S. Provisional Patent Application No. 61/916,890 filed Dec. 17, 2013, the contents of which are incorporated herein by reference in their entirety.

BACKGROUND

1. Field

The present disclosure relates to cooling systems, and more particularly to turbomachine cooling systems 2. Description of Related Art Turbomachines of varying designs and uses require different heat exchanger configurations for various flight or operation regimes. For example, turbomachines for subsonic aircraft can employ a scoop to intake cold air from the atmosphere for use in many of the aircraft cooling systems. However, aircraft at high speed and supersonic speeds must eliminate the scoops to avoid shock waves and/or large amounts of associated drag. This reduces the ability of the turbomachine to regulate temperature of components therein that require cooling at higher speeds.

Such conventional methods and systems have generally been considered satisfactory for their intended purpose. However, there is still a need in the art for improved systems for cooling in gas turbine engines. The present disclosure provides solutions for this need.

SUMMARY

In accordance with at least one aspect of this disclosure, a turbomachine cooling system includes a first low pressure port disposed in a low pressure portion of a turbomachine and a first high pressure port disposed in a high pressure portion of the turbomachine and in selective fluid communication with the first low pressure port via a cooling channel. The high pressure portion of the turbomachine is configured for a higher compression, e.g., connected to a higher compressor stage, than the low pressure portion of the turbomachine where the first low pressure port is disposed. A valve can be disposed between the first high pressure port and the first low pressure port for selectively opening and closing fluid communication between the first high pressure port and the first low pressure port. The cooling system includes a heat exchanger system disposed in the cooling channel such that a flow traveling from the first high pressure port to the first low pressure port is cooled by the heat exchanger system before traveling through the first low pressure port into the low pressure portion of the turbomachine.

In some embodiments, the low pressure portion is a first compressor stage and the high pressure portion is a second compressor stage that is in selective fluid communication with the first low pressure port via the cooling channel. The second compressor stage can be a higher compression stage than the first compressor stage. The heat exchanger system can be disposed in the cooling channel such that compressed air traveling from the first high pressure port to the first low pressure port is cooled by the heat exchanger system before being reintroduced into the compressor at the first compressor stage.

In certain embodiments, the heat exchanger system includes a first heat exchanger configured for thermal communication with air from an atmospheric air intake, a second heat exchanger configured for thermal communication with fuel in a fuel line, and a third heat exchanger configured for thermal communication with a refrigerant of a refrigeration system.

The first, second, and third heat exchangers can be in direct thermal communication with the cooling channel for cooling airflow in thermal contact with the heat exchangers. In some embodiments, two heat exchangers of the first, second, and third heat exchangers can be in direct thermal communication with the cooling channel while the other heat exchanger can be in indirect thermal communication with the cooling channel via the two heat exchangers that are in direct thermal communication with the cooling channel. It is also envisioned that only one heat exchanger of the first, second, and third heat exchangers can be in direct thermal communication with the cooling channel while the other heat exchangers can be in indirect thermal communication via the one heat exchanger that is in direct thermal communication with the cooling channel.

In certain embodiments, the system can further include a system operatively connected to the fuel for de-oxygenating the fuel to increase coking temperature of the fuel and the ability of the fuel to accept more thermal energy from the compressed air in the cooling channel. The system can further include a valve configured to shut off or allow at least one of atmospheric air flow to the first heat exchanger, fuel flow to the second heat exchanger, and/or refrigerant flow to the third heat exchanger. In certain embodiments, the system can further include a secondary channel in fluid communication with the cooling channel and configured to allow cooled compressed air to be redirected to other portions of the turbomachine for cooling thereof.

In at least one aspect of the present disclosure, a method includes bleeding air from a high pressure portion of a turbomachine, cooling the air using at least one heat exchanger disposed in the turbomachine, and reintroducing the air into a lower pressure portion of a turbomachine. 19. In some embodiments, the reintroducing step includes injecting the cooled air into a region proximate a tip of a rotor blade. The method can further include routing a portion of the cooled air to an environmental control system of the aircraft.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
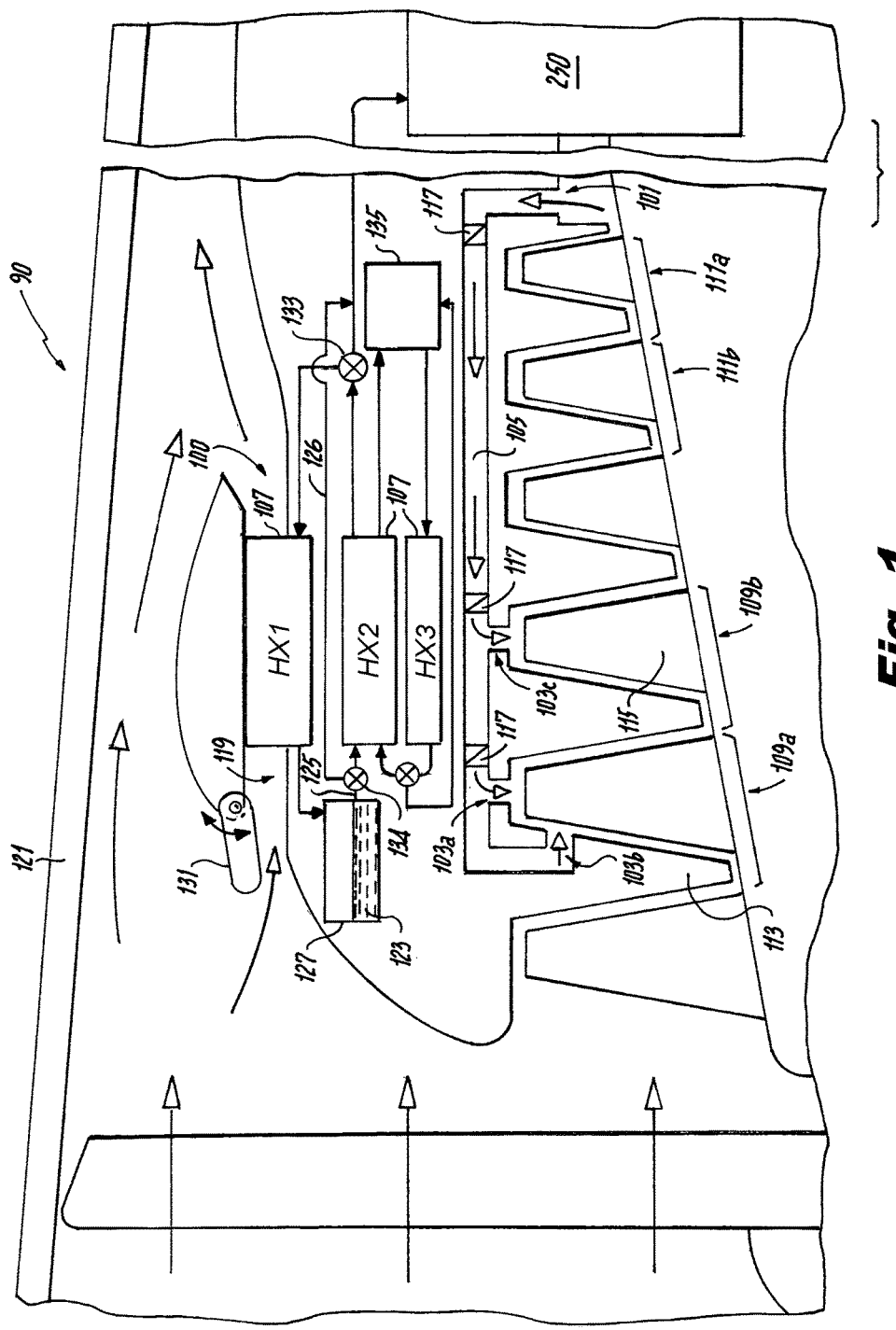
FIG. 1 is a cross-sectional schematic view of a portion of a turbomachine constructed in accordance with the present disclosure, showing an embodiment of a turbomachine cooling system disposed therein.

Reference will now be made to the drawings wherein like reference numerals identify similar structural features or aspects of the subject disclosure. For purposes of explanation and illustration, and not limitation, an embodiment of a turbomachine cooling system in accordance with the disclosure is shown in FIG. 1 and is designated generally by reference character 100. Another embodiment of a turbomachine cooling system in accordance with the disclosure, or aspects thereof, is provided in FIG. 2, as will be described. The systems and methods described herein can be used to increase efficiency of turbomachinery and/or systems related thereto.

In accordance with at least one aspect of this disclosure, a turbomachine cooling system 100 is disposed in a turbomachine 90 and includes a first low pressure port 103a disposed in a low pressure portion of turbomachine 90 and a first high pressure port 101 disposed in a high pressure portion of the turbomachine 90 that is in selective fluid communication with the first low pressure port 103a via a cooling channel 105. There may be additional high pressure ports (not shown) in other stages (e.g. stage 111b) and with a check valve such that as secondary high pressure port does not inadvertently act as a low pressure port. There may also be multiple cooling channels configured to fluidly connect two or more portions having differential pressures. Also, it is contemplated that a high pressure port can be in the same stage as a lower pressure port (e.g. where a high pressure port is aft of a rotor blade and the low pressure port is forward of the same rotor blade in the same stage).

Generally, the high pressure portion of the turbomachine 90 can be any portion of a turbomachine configured for a higher compression than the low pressure portion of the turbomachine where the first low pressure port 103a is disposed. However, in some embodiments such as those depicted in FIGS. 1 and 2, the low pressure portion is at least a first compressor stage 109a and the high pressure portion is at least a second compressor stage 111a that has a higher pressure during operation than the first compressor stage 109a.

Referring to FIG. 1, there may additional low pressure ports 103b, 103c disposed in one or more stages 109a, 109b. As shown, a second low pressure port 103b can be disposed in stator 113 and a third low pressure port 103c can be disposed proximal a compressor blade 115 in stage 109b. While three low pressure ports 103a, 103b, 103c are shown connecting to a single high pressure port 101, it is contemplated that any suitable number of low pressure ports can be disposed in any suitable number of suitable stages and any suitable number of high pressure ports can be disposed in any suitable number of suitable stages.

Also, it is contemplate that any port can act as a high and/or low pressure port depending on a flow path defined therebetween. For example, each stage may have one or more ports, and each port may include a valve disposed therein. A desired flow path may be selected by opening and closing certain valves selectively. For example, if is desired to send the highest compression air from the highest stage 111a through cooling channel 105 back to just the lowest compression stage 109a, only the desired valves in those stages can be open. If it is desired to send compressed air from stage 109b back to stage 109a, the valves for only those stages may be opened.

One or more valves 117 can be disposed between the first high pressure port 101 and the first low pressure port 103a for selectively opening and closing fluid communication between the first high pressure port 101 and the first low pressure port 103a. In embodiments with multiple low pressure ports as shown in FIG. 1, a combination of valves 117 may be employed to selectively choose which ports 103a, 103b, 103c are in fluid communication with the first high pressure port 101 and or with each other. Valves 117 can be any suitable valve configured for passive or active regulation of flow, including, but not limited to check valves, solenoid valves, mechanical valves, and combinations thereof. The valves 117 may be controlled mechanically, electronically via wires or a wireless connection, and/or electromagnetically.

The cooling system 100 includes a heat exchanger system 107 disposed in thermal communication with the cooling channel 105 such that air traveling from the first high pressure port 101 to the first low pressure port 103a is cooled by the heat exchanger system 107 before traveling through the first low pressure port 103a into the low pressure portion of the turbomachine (e.g. compressor stage 109a).

The heat exchanger system 107 can include a first heat exchanger HX1 configured for thermal communication with air from an atmospheric air intake 119. As shown in the embodiment of FIG. 1, the air intake 119 can be housed within fan casing 121. The air intake 119 may be configured to receive air from outside of the fan casing 121. Some embodiments may not include a fan casing 121 such as turbojet style turbomachines. Heat exchanger HX1 is configured to ultimately transfer heat from the compressed air flow in channel 105 to cold air passing through air intake 119.

Heat exchanger HX1 can be in direct thermal communication with channel 105 (shown in FIG. 2), or can be in indirect thermal communication via other heat exchanger loops (as shown in FIG. 1) or any suitable thermal path. Also, heat exchanger HX1 can be used in series and/or in parallel with any suitable number of other heat exchangers, or in other suitable thermal path configuration. For example, as shown in FIG. 1, heat exchanger HX1 can selectively act as a heat sink for a second heat exchanger HX2 and/or third heat exchanger HX3, thereby accepting thermal energy from the heat exchangers HX2 and/or HX3 via direct thermal communication, via a thermal carrier medium (e.g. refrigerant, fuel, water, air, etc.), or via any other suitable indirect thermal path.

The system can further include a valve (e.g. scoop 131) that is configured to shut off or allow bypass air or other cool air flow to the first heat exchanger HX1.

Figure 2:
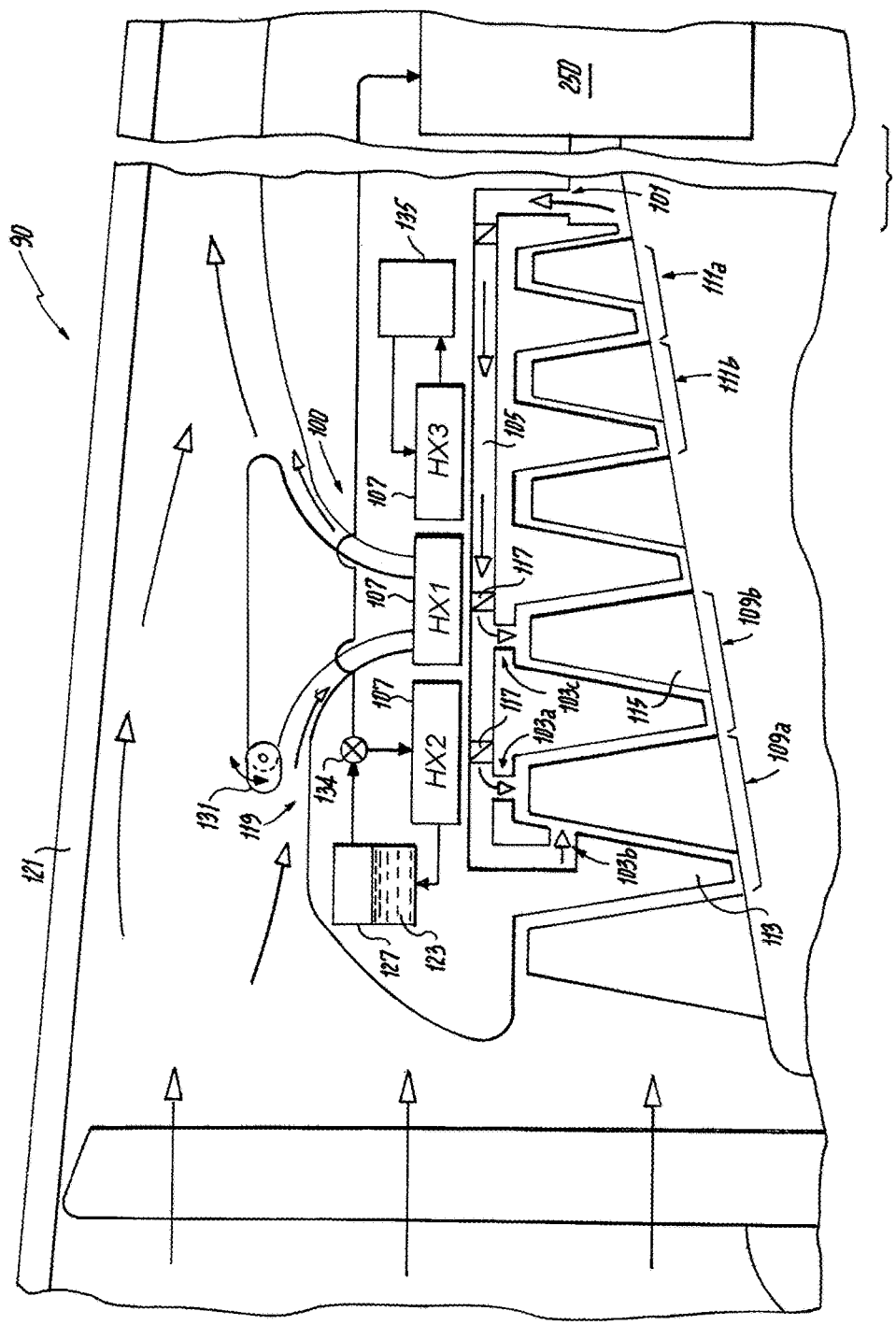
FIG. 2 is a cross-sectional schematic view of a portion of an embodiment of a turbomachine constructed in accordance with the present disclosure, showing another embodiment of a turbomachine cooling system.

Referring to the embodiments of FIGS. 1 and 2, the second heat exchanger HX2 can be configured for thermal communication with fuel 123 from a fuel tank 127 in a fuel line 125. The fuel 123 can pass from the fuel tank 127 through the fuel line 125 to be in thermal communication with the heat exchanger HX2 such that the heat exchanger HX2 transmits thermal energy to the fuel 123 in the fuel line 125. In such an embodiment, the fuel 123 acts as an ultimate heat sink and/or a thermal medium to transmit energy elsewhere (e.g. heat exchanger HX1).

The system can further include a system operatively connected to the fuel 123 for de-oxygenating the fuel to increase the coking temperature of the fuel 123 and the ability of the fuel 123 to accept more thermal energy directly and/or indirectly from the compressed air in the cooling channel 105 and/or from any other thermal source. This prevents the fuel 123 from thermally breaking down, i.e. coking, at higher temperatures.

One or more valves 133 can be disposed in the fuel line 125 to control the flow path and temperature of fuel 123 before it is released from the thermal cycle and sent to the combustion chamber 250. Valve 133 can act as a recirculator allowing at least a portion of fuel 123 to circulate back to the fuel tank 127 after accepting thermal energy from a heat exchanger (e.g. HX2). In some embodiments, the fuel 123 is circulated through at least one heat exchanger (e.g. HX1 as shown in FIG. 1) that is configured to accept thermal energy from the fuel 123, thereby cooling the fuel 123 allowing additional thermal energy to be transferred to the fuel 123 by another thermal source (e.g. HX2). Additionally or alternatively, at least one bypass line 126 and/or valve 134 can be included to allow the fuel 123 to completely bypass that heat exchanger system 107 and pass directly to the combustion chamber 250.

A third heat exchanger HX3 can be included in heat exchanger system 107 that is configured for thermal communication with a refrigerant of a refrigeration system 135. The refrigeration system 135 can be any suitable refrigeration circuit that includes a compressor and a refrigerant. In at least some embodiments, the refrigeration system 135 can be an environmental control system (ECS) that controls the environment of an aircraft cabin.

As shown in FIGS. 1 and 2, the refrigeration system 135 can circulate at least a portion of its refrigerant through heat exchanger HX3 to absorb thermal energy from the fluid flowing in channel 105. Also, as shown in FIG. 1, at least a portion of the refrigerant can be routed to be in thermal communication with another heat exchanger (e.g. HX2) after absorbing thermal energy from the air in the channel 105 in order to remove some heat from the refrigerant before it is recirculated through the refrigeration system 135.

As described above, the first, second, and third heat exchangers HX1, HX2, HX3 can be disposed in series where only one heat exchanger (e.g. HX3, FIG. 1) is in direct thermal communication with the air in channel 105. As another possible configuration shown in FIG. 2, the first, second, and third heat exchangers HX1, HX2, HX3 can each be in direct thermal communication with the cooling channel 105 for cooling airflow in thermal contact therewith. However, it is contemplated that any suitable number of heat exchangers and be in direct thermal communication and any suitable number of heat exchangers can be in indirect thermal communication via being thermally linked to other heat exchangers, thermal carriers, or thermal sources in any suitable manner.

For example, in some embodiments, two heat exchangers can be in direct thermal communication with the cooling channel while the other heat exchanger can be in indirect thermal communication with the cooling channel via the two heat exchangers that are in direct thermal communication with the cooling channel. It is also envisioned that only one heat exchanger of the first, second, and third heat exchangers can be in direct thermal communication with the cooling channel while the other heat exchangers can be in indirect thermal communication via the one heat exchanger that is in direct thermal communication with the cooling channel. Ultimately, as long as there is a thermal path for thermal energy to travel from the air in the cooling channel 105 to some form of a thermal sink (e.g. ambient air, fuel, refrigerant, engine components, etc.), such a configuration is suitable.

In some embodiments, the system 100 can further include a secondary channel in fluid communication with the cooling channel 105 and configured to allow cooled compressed air to be redirected to other portions of the turbomachine 90 for cooling thereof.

Each heat exchanger and/or thermal circuit associated therewith can be controlled for optimizing heat transfer and efficiency in different flight regimes. For example, scoop 131 may allow air flow in at lower flight speed, but present unwanted drag and shockwaves at sufficiently high speed. In this case, scoop 131 may want to close off air intake 119 at high speed, thereby eliminating cool air to sink thermal energy to from heat exchanger HX1. In such a case, the fuel 123 and/or the refrigeration system 135 can act as the primary heat sinks.

In some situations, the fuel 123 may become heated to the point of thermally breaking down, i.e., coking. In this case, the bypass valve 134 can be opened and fuel 123 can be allowed to bypass the process of accepting thermal energy from a heat exchanger (e.g. HX2) via bypass line 126. In the event that the compressor of the refrigeration system 135 fails, the other heat exchangers HX1, HX2 can act as the heat sinks.

In another embodiment, a fourth heat exchanger (not shown, but see, e.g., HX1, HX2, HX3 in FIG. 1-2) can be included that is in direct thermal communication with the channel 105. The fourth heat exchanger can connect a plurality or all of the heat exchangers together in parallel such that a common thermal carrier (e.g. a refrigerant, fuel, oil, etc.) is in thermal communication with all of heat exchangers. In this manner, the thermal carrier can flow, via a pump or other suitable means, from the fourth heat exchanger to any of the other heat exchangers regardless if they are functioning or not. This allows an even distribution of thermal energy via the common thermal carrier, allowing each heat exchanger (e.g. HX1, HX2, HX3) to experience a uniform or a predetermined amount of thermal load.

In at least one aspect of the present disclosure, a method includes bleeding air from a high pressure portion of a turbomachine 90, cooling the air using at least one heat exchanger disposed in the turbomachine 90, and reintroducing the air into a lower pressure portion of a turbomachine 90. The method can also include injecting of cooled, compressed air at the tips of the compressor's lower stage blades to mitigate the compressor's aerodynamic instabilities (i.e., stall, surge, flutter, etc.) by re-attaching the boundary layer flow separation and absorbing some of the air pressure fluctuations.

By cooling compressed air using the above described systems and methods, portions of the compressed, cooled air can be used to cool other thermally-stressed parts of a turbomachine and/or aircraft. The cooled high pressure air can be utilized to cool both stator and rotating blades and shaft of the compressor and turbines. In embodiments where the cooler air is reintroduced into the compression cycle, the cooler, denser air can be more efficiently acted upon by compressor blades 115 and stators 113. Thus, the cooler, denser cooled air can be re-compressed through the lower stages of the compressor improving the engine's overall cycle efficiency. This allows for smaller and lighter components to accomplish the tasks of conventional turbomachine parts for the same required power output, as engine cycle efficiency increases. Thus, active cooling of compressed air as described herein can reliably allow for higher operational compression ratios (OPRs) than in traditional turbomachines, without excessive temperatures in the fluid compressor stages, for example.

Also, cooling such denser, compressed air can be used for various ECS cabin loads (i.e., cooling, trimming, pressurizing, etc.) such that a portion of the cooled air can be drawn to be utilized for the ECS system directly.

In addition, injection of high-momentum (i.e., higher density, velocity) air at the tips of the compressor's lower stage blades can mitigate the compressor's aerodynamic instabilities (i.e., stall, surge, flutter, etc.) by re-attaching the boundary layer flow separation and absorbing some of the air pressure fluctuations that can cause compressor instabilities.

The methods and systems of the present disclosure, as described above and shown in the drawings, provide for turbomachines with superior properties including the potential for improved efficiency, improved compression ratio, lighter weight, and/or improved specific fuel consumption. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A turbomachine cooling system, comprising:
a first low pressure port disposed in a first compressor stage;
a first high pressure port disposed in a second compressor stage and in selective fluid communication with the first low pressure port via a cooling channel, wherein the second compressor stage is a higher compression than the first compressor stage;
a valve disposed between the first high pressure port and the first low pressure port for selectively opening and closing fluid communication between the first high pressure port and the first low pressure port; and
a heat exchanger system disposed in the cooling channel such that a compressed flow traveling from the first high pressure port to the first low pressure port is cooled by the heat exchanger system before being reintroduced into the first compressor stage, wherein the heat exchanger system includes:
a first heat exchanger configured for thermal communication with air from an atmospheric air intake;
a second heat exchanger configured for thermal communication with fuel in a fuel line; and
a third heat exchanger configured for thermal communication with a refrigerant of a refrigeration system.

2. The turbomachine cooling system of claim 1, wherein the first, second, and third heat exchangers are in direct thermal communication with the cooling channel for cooling the compressed flow in thermal contact with the heat exchangers.

3. The turbomachine cooling system of claim 1, wherein only two heat exchangers of the first, second, and third heat exchangers are in direct thermal communication with the cooling channel, the other heat exchanger being in indirect thermal communication with the cooling channel via the two heat exchangers that are in direct thermal communication with the cooling channel.

4. The turbomachine cooling system of claim 1, wherein only one heat exchanger of the first, second, and third heat exchangers is in direct thermal communication with the cooling channel, the other heat exchangers being in indirect thermal communication via the one heat exchanger that is in direct thermal communication with the cooling channel.

5. The turbomachine cooling system of claim 1, further comprising a system operatively connected to the fuel for de-oxygenating the fuel to increase coking temperature of the fuel and the ability of the fuel to accept more thermal energy from the compressed flow in the cooling channel.

6. The turbomachine cooling system of claim 1, wherein the refrigeration system that the third heat exchanger is configured to be in thermal communication with is an environmental control system of an aircraft.

7. The turbomachine cooling system of claim 1, further comprising a valve configured to shut off or allow at least one of atmospheric air flow to the first heat exchanger, fuel flow to the second heat exchanger, or refrigerant flow to the third heat exchanger.

8. The turbomachine cooling system of claim 1, further comprising a secondary channel in fluid communication with the cooling channel and configured to allow cooled compressed flow to be redirected to other portions of the turbomachine or aircraft for cooling thereof.

9. A turbomachine cooling system, comprising:
a first low pressure port disposed in a low pressure portion of a turbomachine;
a first high pressure port disposed in a high pressure portion of the turbomachine and in selective fluid communication with the first low pressure port via a cooling channel, wherein the high pressure portion of the turbomachine is configured for a higher compression than the low pressure portion of the turbomachine where the first low pressure port is disposed;
a valve disposed between the first high pressure port and the first low pressure port for selectively opening and closing fluid communication between the first high pressure port and the first low pressure port; and
a heat exchanger system disposed in the cooling channel such that a flow traveling from the first high pressure port to the first low pressure port is cooled by the heat exchanger system before traveling through the first low pressure port into the low pressure portion of the turbomachine, wherein the heat exchanger system includes:
a first heat exchanger configured for thermal communication with air from an atmospheric air intake;
a second heat exchanger configured for thermal communication with fuel in a fuel line; and
a third heat exchanger configured for thermal communication with a refrigerant of a refrigeration system.

10. The turbomachine cooling system of claim 9, wherein the first, second, and third heat exchangers are in direct thermal communication with the cooling channel for cooling the flow in thermal contact with the heat exchangers.

11. The turbomachine cooling system of claim 9, wherein only two heat exchangers of the first, second, and third heat exchangers are in direct thermal communication with the cooling channel, the other heat exchanger being in indirect thermal communication with the cooling channel via the two heat exchangers that are in direct thermal communication with the cooling channel.

12. The turbomachine cooling system of claim 9, wherein only one heat exchanger of the first, second, and third heat exchangers is in direct thermal communication with the cooling channel, the other heat exchangers being in indirect thermal communication via the one heat exchanger that is in direct thermal communication with the cooling channel.

13. The turbomachine cooling system of claim 9, further comprising a system operatively connected to the fuel for de-oxygenating the fuel to increase a coking temperature of the fuel and the ability of the fuel to accept more thermal energy from the flow in the cooling channel.

14. The turbomachine cooling system of claim 9, wherein the refrigeration system that the third heat exchanger is configured to be in thermal communication with is an environmental control system of an aircraft.

15. The turbomachine cooling system of claim 9, further comprising a valve configured to shut off or allow at least one of atmospheric air flow to the first heat exchanger, fuel flow to the second heat exchanger, or refrigerant flow to the third heat exchanger.

16. A method, comprising:
bleeding air from a high pressure portion of a turbomachine;
cooling the air using at least one heat exchanger disposed in the turbomachine, wherein the heat exchanger system includes:
a first heat exchanger configured for thermal communication with air from an atmospheric air intake;
a second heat exchanger configured for thermal communication with fuel in a fuel line; and
a third heat exchanger configured for thermal communication with a refrigerant of a refrigeration system; and
reintroducing the cooled air into a lower pressure portion of a turbomachine.

17. The method of claim 16, wherein the reintroducing step includes injecting the cooled air into a region proximate a tip of a rotor blade.

18. The method as in claim 16, further comprising routing a portion of the cooled air to an environmental control system of the aircraft.

* * * * *